Figure 1:
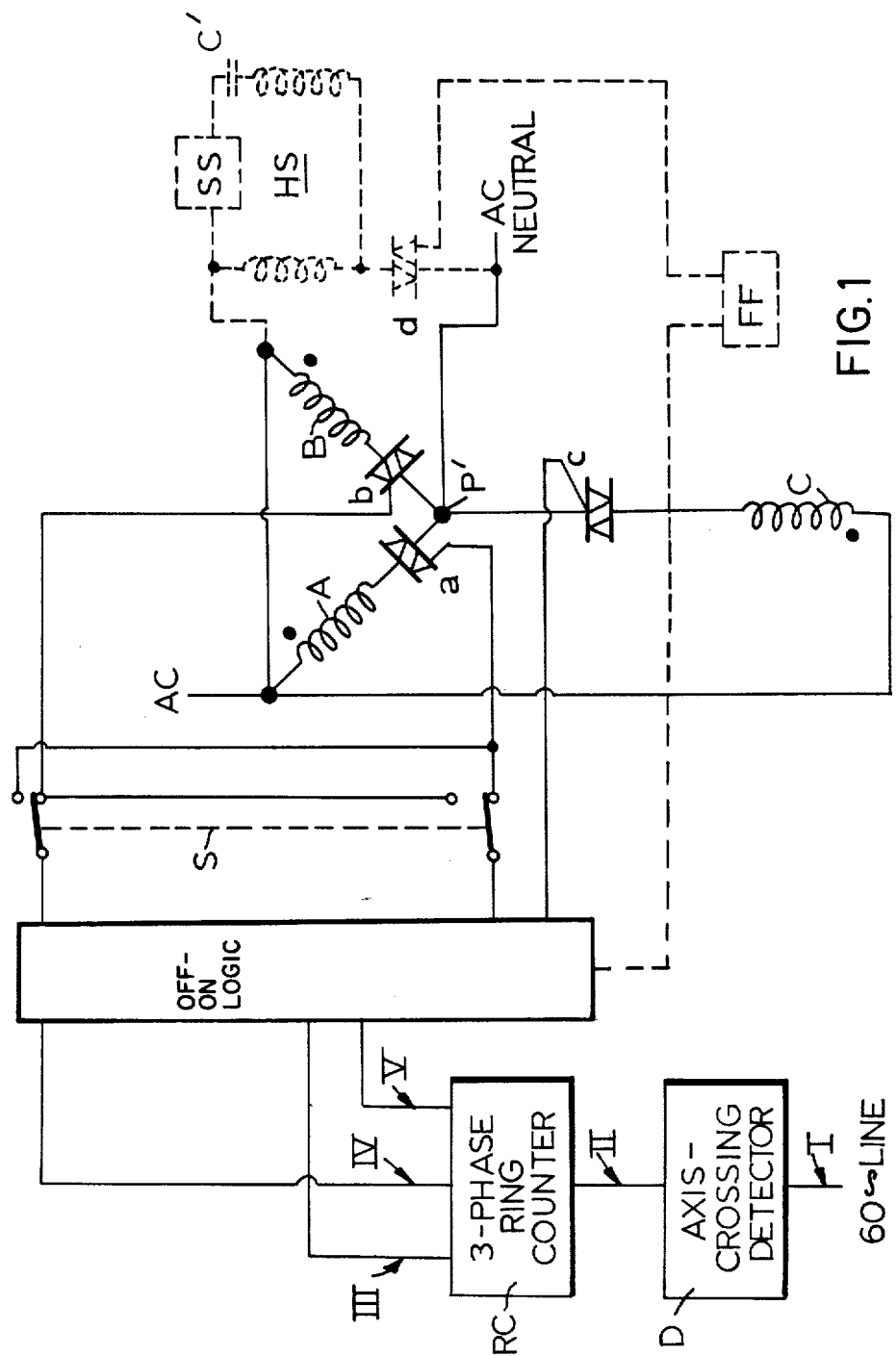

United States Patent [19]

Katz et al.

[11] 4,300,077
[45] Nov. 10, 1981

[54] TRANS-SYNCHRONOUS MOTOR APPARATUS AND METHOD

[75] Inventors: Leonhard Katz, Winchester; Lawrence A. Ormord, Lynn, both of Mass.

[73] Assignee: Astro Dynamics, Inc., Woburn, Mass.

[21] Appl. No.: 104,184

[22] Filed: Dec. 17, 1979

[51] Int. Cl.³ .................. H02P 7/36; H02M 5/22
[52] U.S. Cl. .................. 318/812; 318/768; 363/10; 363/159
[58] Field of Search ............ 318/812, 739, 749, 756, 318/768, 773, 777; 363/9, 10, 11, 12, 159, 160

[56] References Cited

U.S. PATENT DOCUMENTS

| | | | |
|---|---|---|---|
| 3,307,094 | 2/1967 | Ogle | 318/341 |
| 3,581,185 | 5/1971 | Hermes et al. | 363/10 |
| 3,991,353 | 11/1976 | Katz et al. | 318/809 |

FOREIGN PATENT DOCUMENTS

| | | | |
|---|---|---|---|
| 1099067 | 2/1958 | Fed. Rep. of Germany | 363/9 |
| 2258031 | 3/1974 | Fed. Rep. of Germany | 318/812 |
| 2703309 | 7/1978 | Fed. Rep. of Germany | 318/739 |
| 28661 | of 1911 | United Kingdom | 318/739 |
| 432652 | 11/1974 | U.S.S.R. | 363/9 |
| 197708 | 8/1977 | U.S.S.R. | 363/9 |

OTHER PUBLICATIONS

PCT/SE79/00030-2/13/79–Wihk et al., vol. 96, No. 1, 1976 of Elec. Engr. in Japan–"Direct Freq. Conv. Using Triac's"–by C. Kamiyanagi et al., pp. 72–79.

Primary Examiner—J. V. Truhe
Assistant Examiner—Richard M. Moose
Attorney, Agent, or Firm—Rines and Rines, Shapiro and Shapiro

[57] ABSTRACT

This disclosure is concerned with a motor technique for generating speeds that are fractions of synchronous speeds, through novel time-staggered selected half-cycle energization of a plurality of magnetic poles by a controlled switching sequence, generating such a fractional motor speed that would otherwise have to be produced by a much larger number of magnetic poles.

14 Claims, 2 Drawing Figures

TRANS-SYNCHRONOUS MOTOR APPARATUS AND METHOD

The present invention relates to methods of and apparatus for the motor-generation of speeds that are predetermined fractions of synchronous speeds (accordingly termed herein "fractional trans-synchronous" operation); more specifically, the generating of speeds in revolutions per minute (rpm) that are selected fractions of, generally, 120 f/P, where f is the power line frequency in cycles per second, and P is the number of magnetic poles of the motor.

Conventional motors operate at substantially the synchronous speed 120 f/P. A 2-pole motor, for example, operates at the maximum speed of 3600 rpm; with 6 poles being required for one-third such maximum speed (1200 rpm), and 18 poles for one-eighth the maximum speed (400 rpm). In accordance with discoveries underlying the present invention, however, it is no longer necessary to increase the number of poles in order to operate at fractions of synchronous speed; such that even small fractional speed operation can be obtained with but few poles, whereas the usual requirement of many poles might otherwise render impractical the attainment of such operation. This novel result is attained with the aid of the philosphy of sequence switching of power to the different poles disclosed in our earlier U.S. Pat. No. 3,991,353, though with important and critical differences. Lower speeds are obtained without resorting to an increase in the number of poles by subdividing the incoming power into half-cycles of power at selected and symmetrically staggered intervals, with each pole effectively powered thus at a lower frequency than the actual line frequency.

As a corollary of such operation, the utilization of the power line may be one hundred percent, since the power line is used continuously without interruption. In a preferred embodiment, the power may emanate from a single phase which is switched to operate at, say, ⅓ normal synchronous speed, and with the motor behaving like a 3-phase motor. This permits starting without the need for conventional auxiliary devices, and further permits easy reversal of the motor, as later more fully explained.

An object of the present invention, accordingly, is to provide a new and improved method of and apparatus for motor-generating fractional synchronous speeds void of the conventional necessity for increasing the number of magnetic motor poles, as before discussed.

A further object is to provide a novel fractional speed trans-synchronous motor of considerable flexibility, including features of one or more of starting without auxiliary devices, ready reversal facility, and adaptability for time-sharing with high-speed motor operation, as for applications requiring sequenced low and high-speed motor operation as in washing machines and other applications.

Other and further objects will be explained hereinafter and are more particularly pointed out in the appended claims. In summary, however, from one of its broader aspects, the invention embraces a method of generating motor speeds in revolutions per minute that are fractions of 120 f/P, where f is the line frequency in cycles per second and P is an even number of magnetic poles, that comprises, applying ac power to geometrically displaced terminals of a plurality of magnetic poles; selecting a full half-cycle of the power energy n half cycles for energizing each of the magnetic poles, with n selected to correspond to the denominator of the desired fraction of 120 f/P for the motor speed; switching the power applied to each of said terminals in accordance with such selecting to cause the selected half-cycles for each pole to be symmetrically time-staggered with respect to the selected half cycles of the other poles; and controlling the sequence of said switching to cause each of the said magnetic poles to be energized at different times than another pole by energy from said corresponding selected half cycles to produce an effective excitation field that generates a motor speed of said fraction of 120 f/P. Preferred constructional details and best mode operational conditions are later presented.

Figure 2:
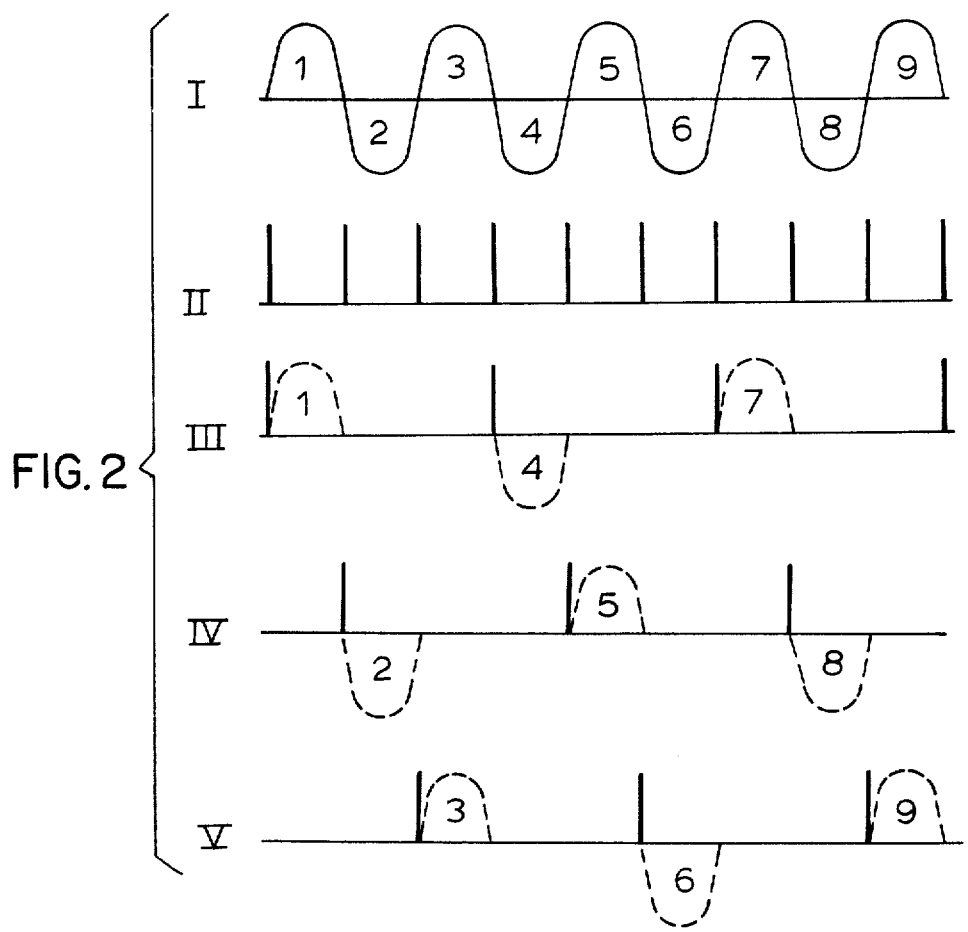

The invention will now be described in connection with the accompanying drawing, FIG. 1 of which is a combined schematic and block diagram of a preferred embodiment operating in accordance with the method of the invention; and FIG. 2 is a waveform diagram showing the relative timing of the energization of the magnetic poles of the motor of FIG. 1.

Referring to FIG. 1, an example of a preferred motor of the invention is shown having three symmetrically geometrically displaced windings A, B and C with six magnetic poles, connected in Y-fashion. Clearly the invention may be used with other types of winding connections and other even numbers of magnetic poles. The windings have their output terminals connected to a power source AC—in this case, a single phase source—with the AC neutral line, so-labelled, at the common connection point P' of the windings A, B and C. Triacs or other switching devices a, b and c respectively connect the inner pole terminals of the respective windings A, B and C with the common point P'. The respective switching triacs a, b and c are triggered from leads III, IV and V of the output of a three-phase ring counter RC, controlled by the output II of a zero-axis-crossing detector D that produces a pulse for each zero-crossing of the waveform I of the input 60-cycle line.

As more particularly illustrated in the waveform diagrams of FIG. 2, the single phase line voltage I has successive opposite-polarity sine wave half-cycles numbered 1 through 9. The axis-crossing detector D generates the pulses of waveform II, FIG. 2, at each zero-crossing. A suitable axis-crossing detector is described, for example, in Electronic Design, 9/27/75, p. 104, though other conventional circuits for performing this known function may also be employed. The synchronous time-staggered outputs III, IV and V (FIG. 2) of the counter RC (such as of the type described in Signetics Corp. 9/69 Applications (Memos, 7-4), or any other well-known type), are respectively applied to switching devices a, b and c. Thus, to windings A, B and C are fed selected full half-cycles 1, 4, 7, etc., 2, 5, 8, etc., and 3, 6, 9, etc., the switching devices a, b, and c energizing the respective windings in this time-staggered fashion. This is as contrasted from selected portions only of half cycles required for the greater or higher than synchronous speeds effected with the technique of our said Letters Patent. In this case, the selected full half-cycles for the magnetic poles of winding A occur every three half-cycles; with the same for winding B and winding C, though the selected half-cycle groups energizing each winding are symmetrically time-staggered with respect to those of the other windings. The control of the switching at a, b and c causes each of the winding magnetic poles to be energized at different times than the other poles, by the energy from the corresponding selected half cycles, producing an effective excitation field that generates a fractional motor speed of ⅓ of said 120 f/P, or 400 rpm. Specifically, the detector D derives pulses II at the zero crossings of the sine-waves I. Every third zero crossing, a pulse is provided (III) which is applied to the trigger gate of triac a. Pulses IV are generated every third zero crossing plus one, and are applied to gate the triac b to energize winding B. Similarly, time-staggered pulses V are generated every third zero crossing plus two, and are applied to trigger triac c to energize winding C.

In general, the full half cycle selection will be every n half-cycles, where n corresponds to the denominator in the desired fraction 1/n of 120 f/P; in the above, example, with n=3 and P=6. The operation corresponds effectively to three-phase motor operation, and obviates the need for 18 poles that would otherwise be required in conventional motors to generate 400 rpm, as before discussed, and obviates also the necessity for conventional auxiliary starting devices.

The invention, furthermore, enables facile motor-direction reversal, merely by interchanging two output feeds from the counter RC, as schematically illustrated by the switches S of FIG. 1, which in actual practice, preferably assume the form of conventional logic switches. This operation is useful in such applications as washing machines or other systems where controlled or programmed reversals are required. In washing or other related machines, moreover, it is desirable to have high-speed motor driving following low-speed operation. This can readily be attained by disabling or de-energizing the low or fractional speed motor of FIG. 1 at an appropriate time and switching to high-speed windings, shown dotted at HS, with a conventional start switch SS and capacitor C′. This is illustrated as effected under the control of another triac or similar switch d, activated from, for example, a flip flop FF that controls the gating leads to triacs a, b and c, as schematically shown in dotted lines, to disable the low-speed motor A-B-C. It is critical, however, that such switching to the high-speed motor be effected only when the operation of the fractional or slow-speed motor A-B-C is in the correct direction and is running at its full speed, with switch-over at a zero crossing, as before discussed.

Similarly, with the fractional speed motor of the invention, turning on and off and the sequential switching involved in the motor operation must all be effected at such zero crossings of the half cycles. While the illustrative example given above is predicated upon single phase power input, the invention may also be used with multiple-phase power sources. The switch-over to high speed operation, when desired, may make use of a pair of the low-speed windings with an auxiliary phase-shifting capacitor or other device connected between the free terminals thereof, in place of a separate high-speed motor. Further modifications will also suggest themselves to those skilled in the art, such being considered to fall within the spirit and scope of the invention as defined in the appended claims.

What is claimed is:

1. A method of generating motor speeds in revolutions per minute that are fraction (1/n) of 120 f/P, where f is the line frequency in cycles per second and P is an even number of magnetic poles, that comprises, applying ac power to geometrically displaced terminals of a plurality of magnetic poles; selecting a full half cycle of the power every n half cycles for energizing each of the magnetic poles, wherein n corresponds to the denominator of the desired fraction of 120 f/P for the motor speed; switching the power applied to each of said terminals in accordance with such selecting to cause the selected half cycles for each pole to be symmetrically time-staggered with respect to the selected half cycles of the other poles; and controlling the sequence of said switching to cause each of the said magnetic poles to be energized at different times than another pole by energy from said correponding selected half cycles to produce an effective excitation field that generates a motor speed of said fraction of 120 f/P.

2. A method as claimed in claim 1 and in which the applied a.c. power is single phase.

3. A method as claimed in claim 2 and in which P=6 and the fractional speed is 400 rpm.

4. A method as claimed in claim 1 and in which said switching is effected at the zero-axis crossings of said half cycles.

5. A method as claimed in claim 4 and in which the motor is switched on and off at said zero-axis crossings.

6. A method as claimed in claim 1 and in which selected half cycles respectively applied to corresponding poles are interchanged to reverse the direction of motor operation.

7. A method as claimed in claim 1 and in which said magnetic poles are de-energized and said power is switched over to a high speed winding when the fractional speed motor is running in the correct direction at its full fractional speed, with the switch-over effected at a zero-axis crossing of the said half cycles.

8. Trans-synchronous motor apparatus for generating speeds in revolutions per minute that are a fraction (1/n) of 120 f/P, where f is the line frequency in cycles per second and P is an even number of magnetic poles, said apparatus having, in combination, three geometrically spaced and connected magnetic-pole windings, each having a switch for controlling the energizing of the corresponding winding from a power source; means for producing pulses corresponding to the zero axis crossing of the power; means responsive to the pulse-producing means for selecting for each of said windings a full half cycle of the power energy every n half cycles, wherein n corresponds to the denominator of the desired fraction of 120 f/P, with the selected half cycles for each winding being symmetrically time-staggered with respect to those of the other windings; and means responsive to the selecting means for controlling the winding switches to energize each winding at different times from other windings during corresponding selected half cycles to produce an effective excitation field that generates a motor speed of said fraction of 120 f/P.

9. Trans-synchronous motor apparatus as claimed in claim 8 and in which the applied power is single phase.

10. Trans-synchronous motor apparatus as claimed in claim 8 and in which the three windings provide six magnetic poles.

11. Trans-synchronous motor apparatus as claimed in claim 8 and in which the control of said switches is effected at the zero-axis crossings of said half cycles.

12. Trans-synchronous motor apparatus as claimed in claim 11 and in which means is provided to effect turn on and switch off of said motor at said zero-axis crossings.

13. Trans-synchronous motor apparatus as claimed in claim 8 and in which means is provided for interchanging the connections applying the selected half cycles of two of the windings to reverse the direction of motor operation.

14. Trans-synchronous motor apparatus as claimed in claim 8 and provided with means for deenergizing the motor apparatus when the same is running in the correct direction at its full fractional speed and at a zero-axis crossing of said half cycles, and for switching the power to a high speed winding to effect high speed motor operation.

* * * * *